United States Patent
Niessner et al.

(10) Patent No.: US 9,714,310 B2
(45) Date of Patent: Jul. 25, 2017

(54) STYRENE COPOLYMER COMPOSITIONS HAVING AN IMPROVED GLOSS

(71) Applicant: INEOS STYROLUTION GROUP GMBH, Frankfurt (DE)

(72) Inventors: Norbert Niessner, Friedelsheim (DE); Phillip Boeckmann, Bad Duerkheim (DE); Maarten Staal, Limburgerhof (DE); Rolf Minkwitz, Mannheim (DE)

(73) Assignee: INEOS STYROLTION GROUP GMBH (DE)

( * ) Notice: Subject to any disclaimer, the term of this patent is extended or adjusted under 35 U.S.C. 154(b) by 0 days.

(21) Appl. No.: 14/914,495

(22) PCT Filed: Aug. 26, 2014

(86) PCT No.: PCT/EP2014/068037
§ 371 (c)(1),
(2) Date: Feb. 25, 2016

(87) PCT Pub. No.: WO2015/028449
PCT Pub. Date: Mar. 5, 2015

(65) Prior Publication Data
US 2016/0200906 A1    Jul. 14, 2016

(30) Foreign Application Priority Data

Aug. 27, 2013   (EP) ..................................... 13181799

(51) Int. Cl.
  *C08L 51/00*   (2006.01)
  *C08F 265/04*   (2006.01)
(52) U.S. Cl.
  CPC .......... *C08F 265/04* (2013.01); *C08L 51/003* (2013.01); *C08L 2205/025* (2013.01); *C08L 2207/53* (2013.01)
(58) Field of Classification Search
  CPC ........ C08L 25/12; C08L 51/04; C08L 51/003; C08L 2207/53; C08L 2205/025
  USPC ......................................... 524/504
  See application file for complete search history.

(56) References Cited

U.S. PATENT DOCUMENTS

| | | | |
|---|---|---|---|
| 4,224,419 A | 9/1980 | Swoboda et al. | |
| 4,634,734 A | 1/1987 | Hambrecht et al. | |
| 4,788,253 A | 11/1988 | Hambrecht et al. | |
| 4,876,313 A | 10/1989 | Lorah | |
| 5,252,666 A * | 10/1993 | Seitz ..................... | C08F 265/04 524/504 |

FOREIGN PATENT DOCUMENTS

| | | |
|---|---|---|
| CA | 2413168 A1 | 8/1995 |
| DE | 1260135 A | 2/1968 |
| DE | 2311129 A1 | 9/1974 |
| DE | 2826925 A1 | 1/1980 |
| DE | 3149358 A1 | 6/1983 |
| DE | 3227555 A1 | 1/1984 |
| DE | 4006643 A1 | 9/1991 |
| DE | 4131729 A1 | 3/1993 |
| DE | 4132497 A1 | 4/1993 |
| EP | 0535456 A1 | 4/1993 |
| EP | 0669367 A1 | 8/1995 |
| EP | 0698637 A2 | 2/1996 |
| GB | 1124911 A | 8/1968 |
| WO | 03/037942 A1 | 5/2003 |

OTHER PUBLICATIONS

English abstract of DE 2311129A, Sep. 12, 1974.
English abstract of DE 3227555A, Jan. 26, 1984.
English abstract of DE 4131729A1, Mar. 25, 1993.
English abstract of DE 4132497A1, Apr. 1, 1993.
English abstract of DE 10153386A1, May 15, 2003.
English abstract of EP 0535456A1, Apr. 7, 1993.
English abstract of EP 0698637A, Feb. 28, 1996.

* cited by examiner

*Primary Examiner* — Hui Chin
(74) *Attorney, Agent, or Firm* — J.A. Lindeman & Co., PLLC

(57) ABSTRACT

Thermoplastic copolymer compositions which contain 50 to 82 wt.-% of a SAN copolymer Al and 15 to 55 wt.-% of a graft copolymer A2, which has an average particle size of 50 to 150 nm and is constituted of at least one rubber-like graft base with a glass transition temperature Tg<0° C., at least one alkyl acrylate, the cyclic cross-linking agent dicyclopentadienyl acrylate and a non-cyclic, additional cross-linking agent, and of 20 to 40 wt.-% of at least one graft shell composed of styrene and acrylonitrile; and auxiliary agents and/or additives, have improved gloss when exposed to weathering.

16 Claims, 8 Drawing Sheets

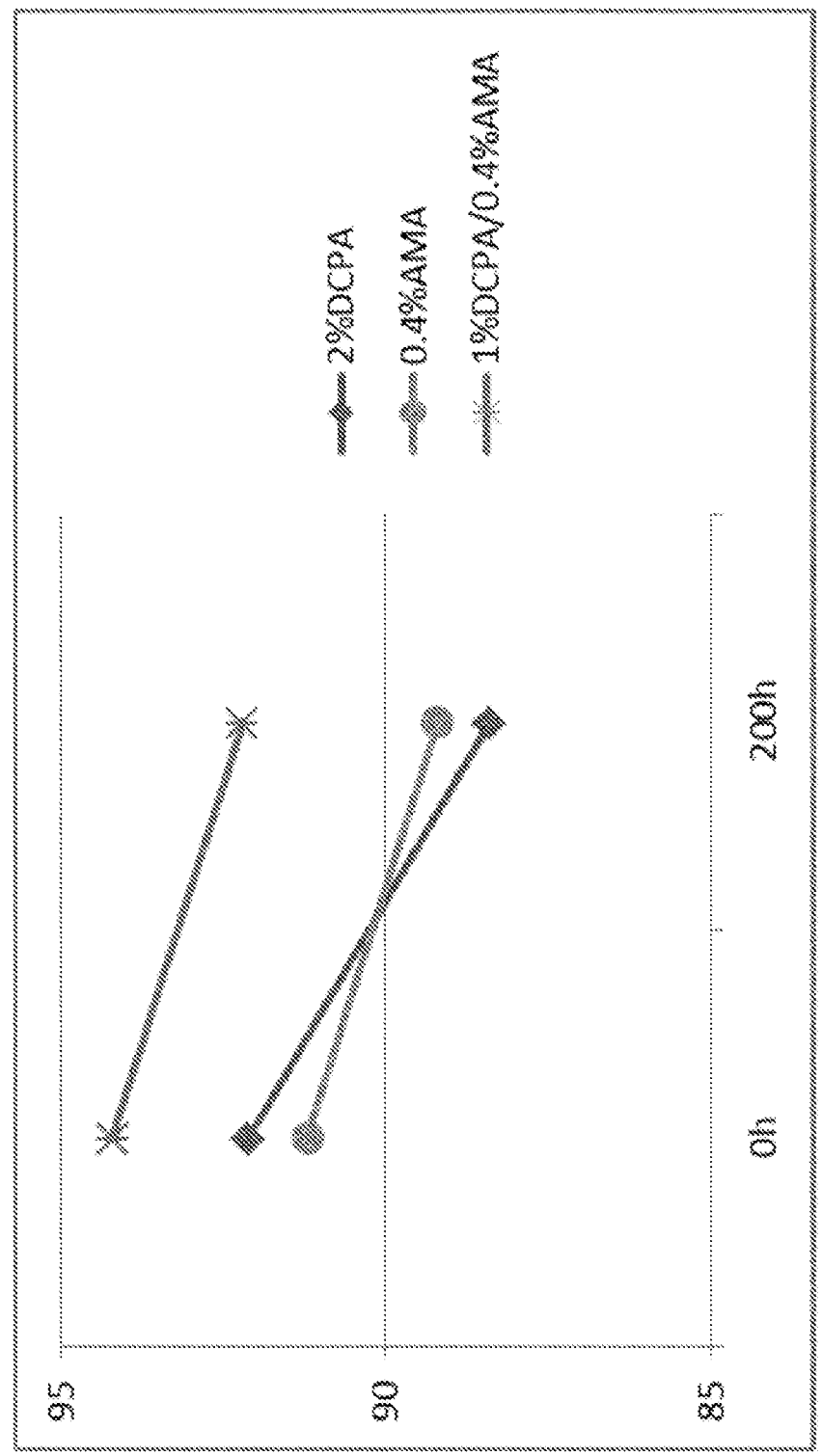
(Fig. 1)

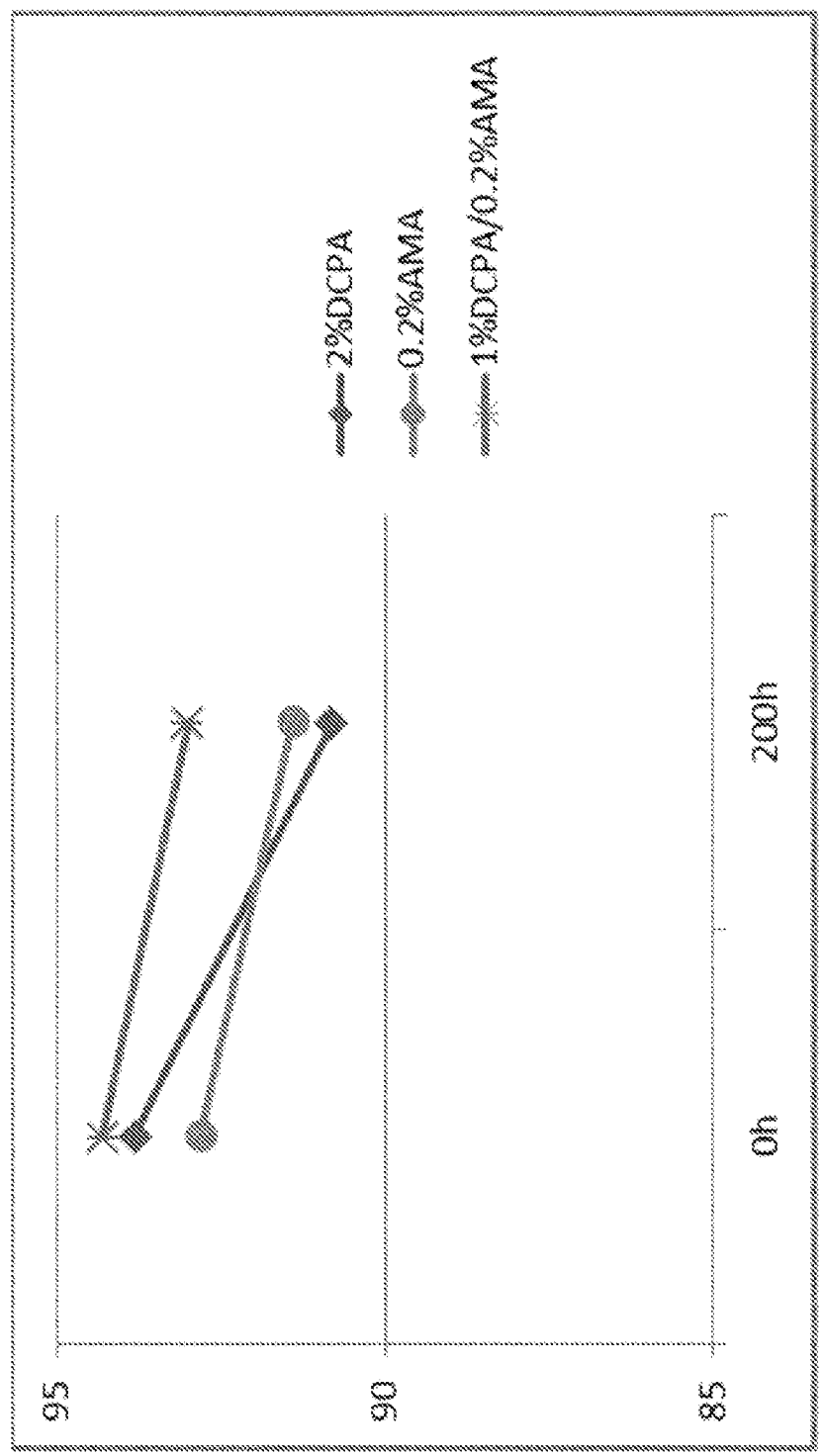
(Fig. 2)

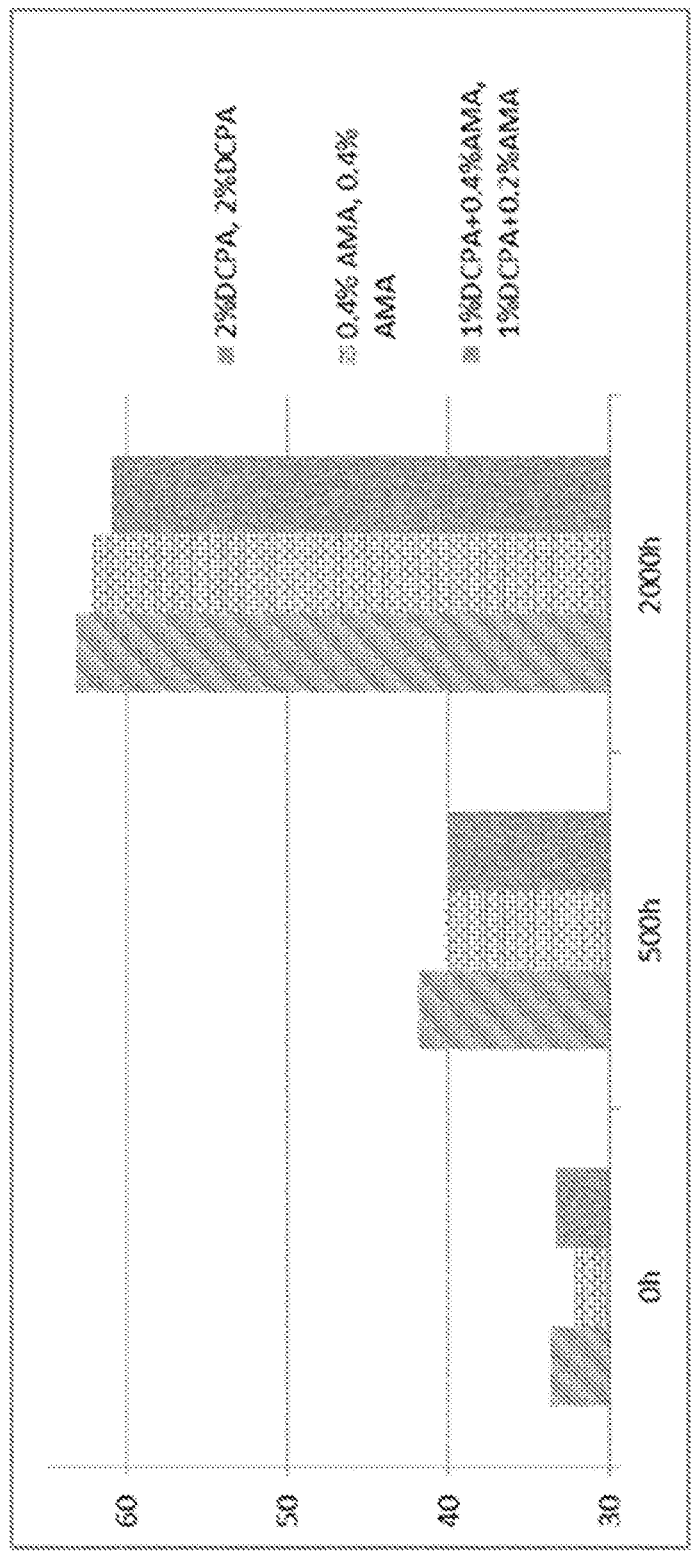
(Fig. 3)

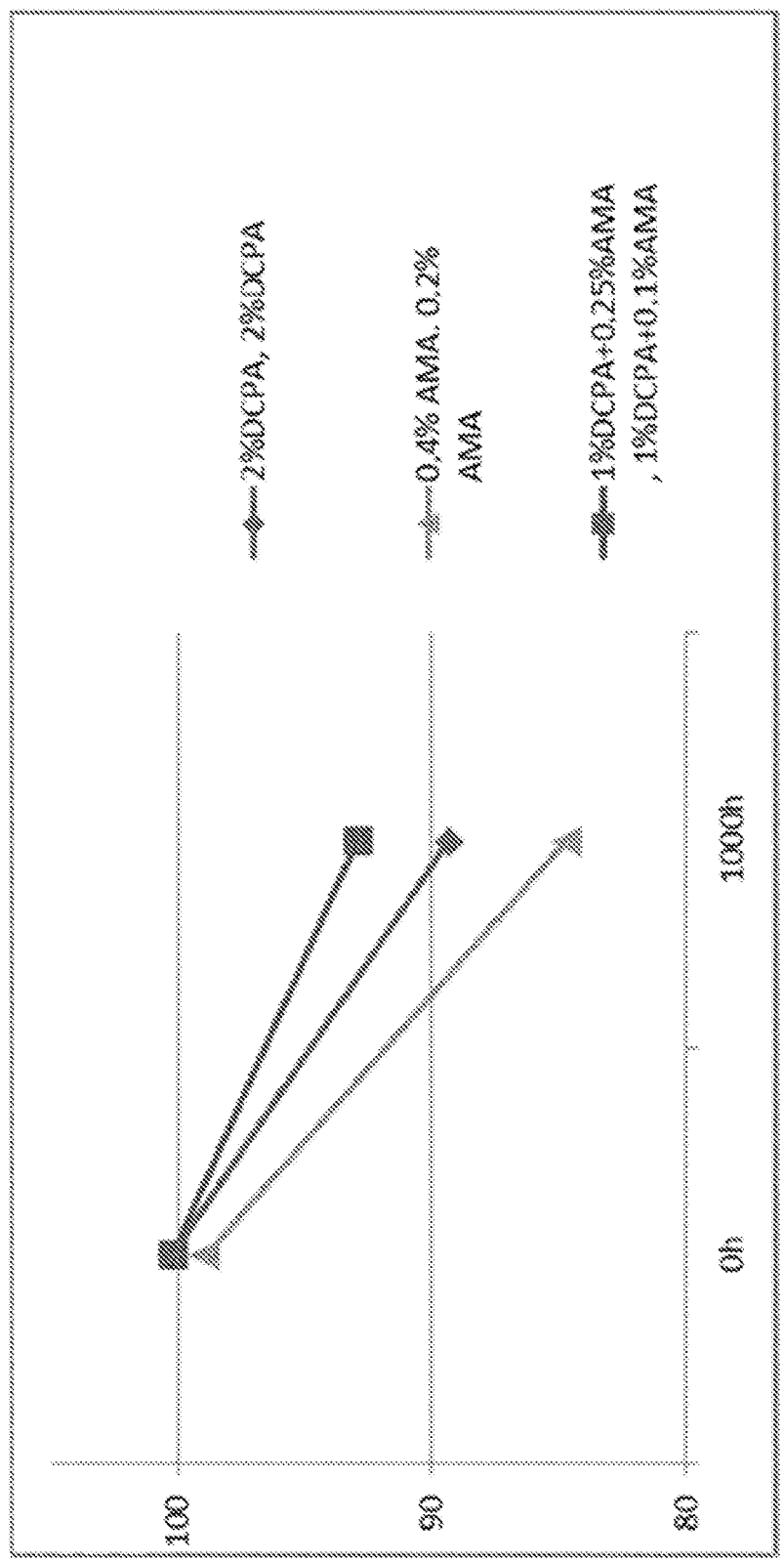
(Fig. 4)

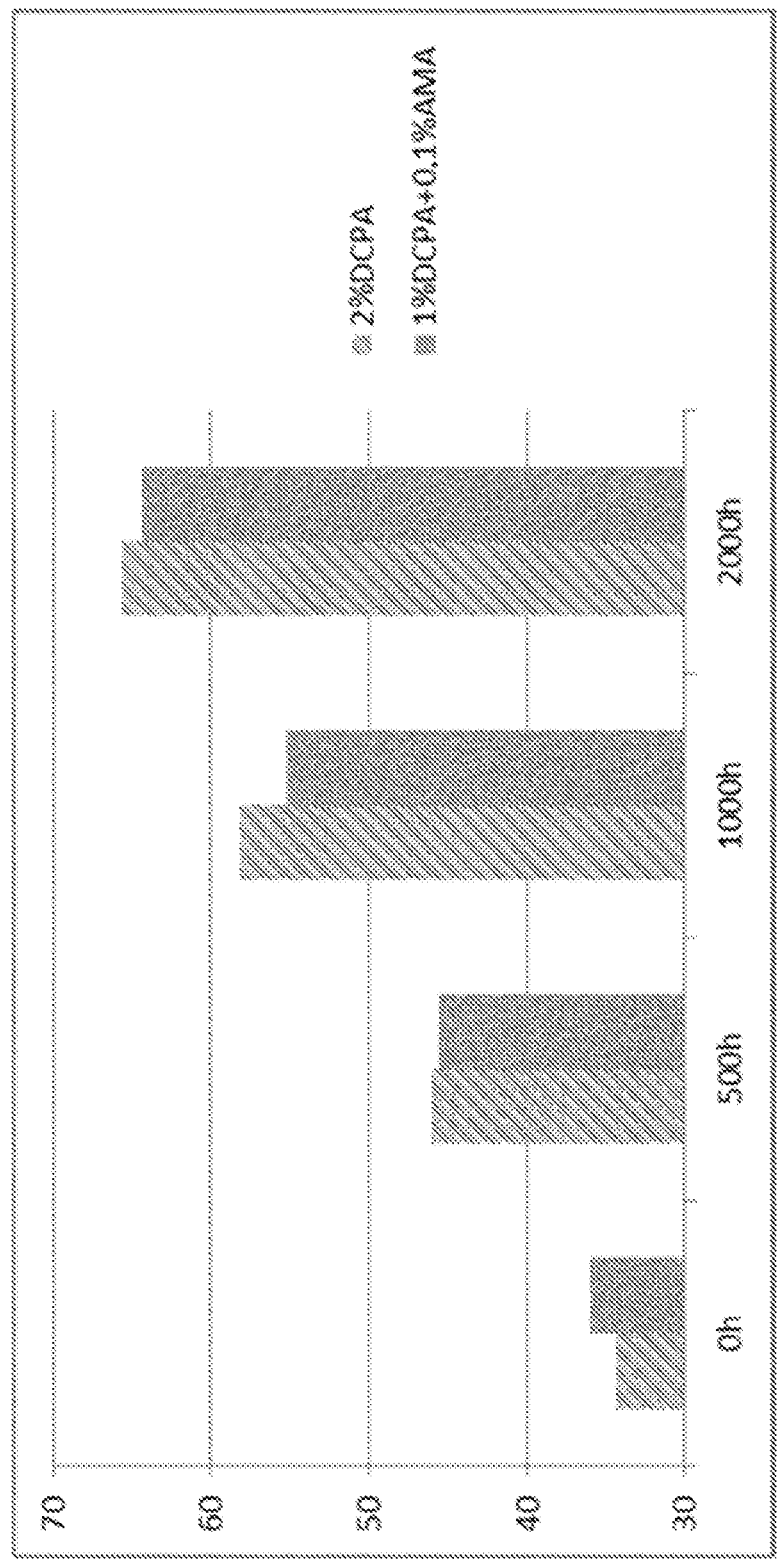
(Fig. 5)

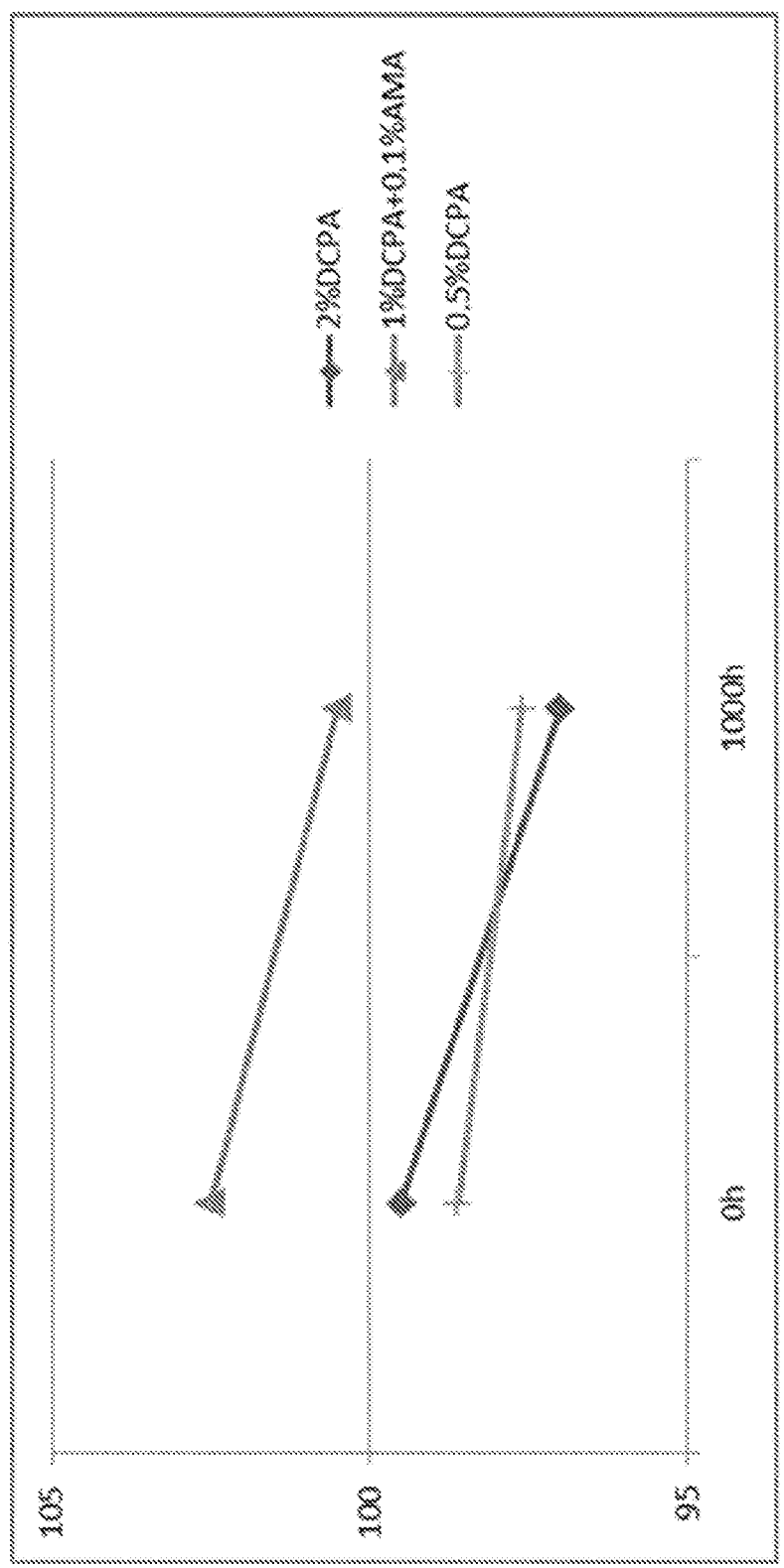
(Fig. 6)

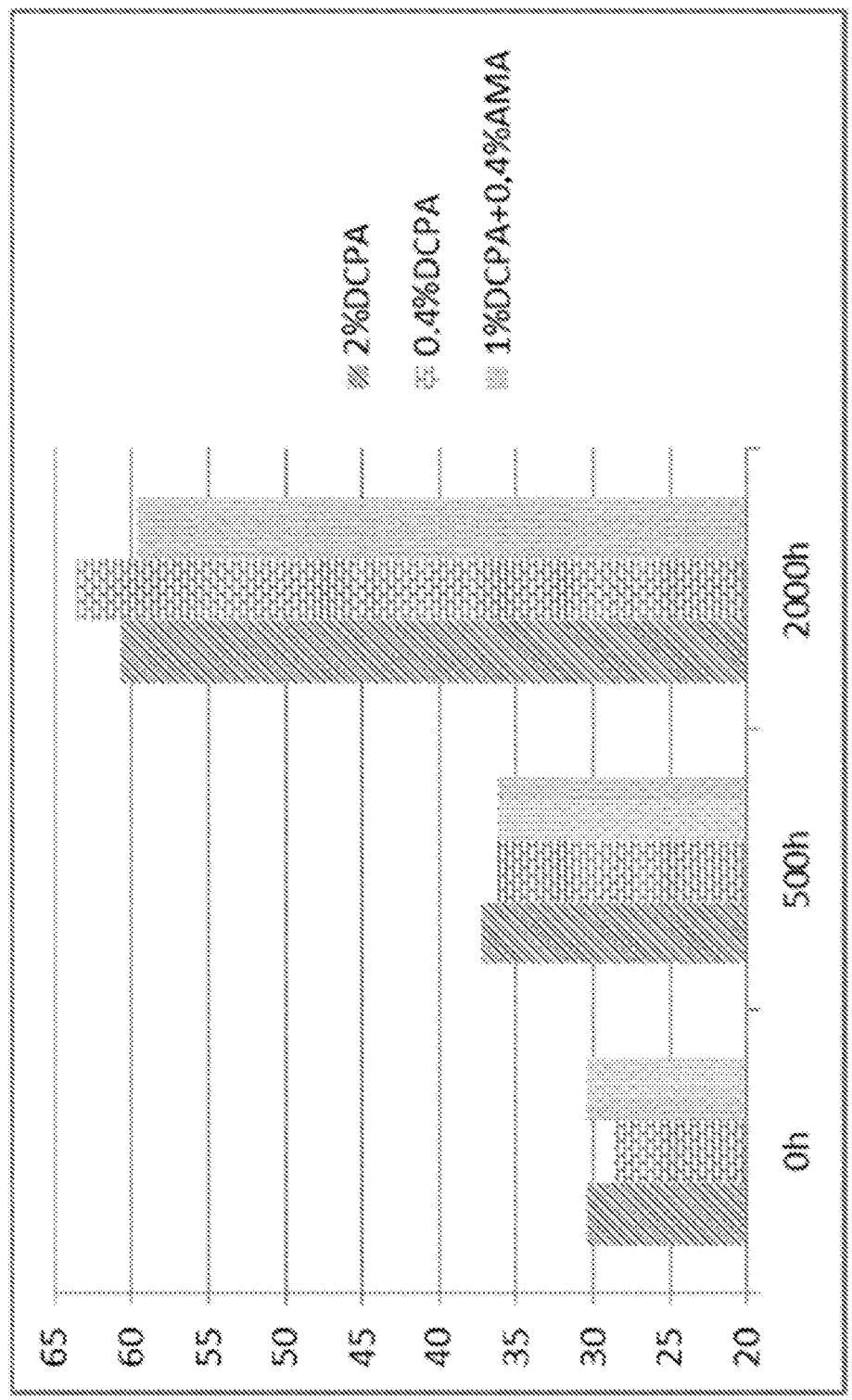
(Fig. 7)

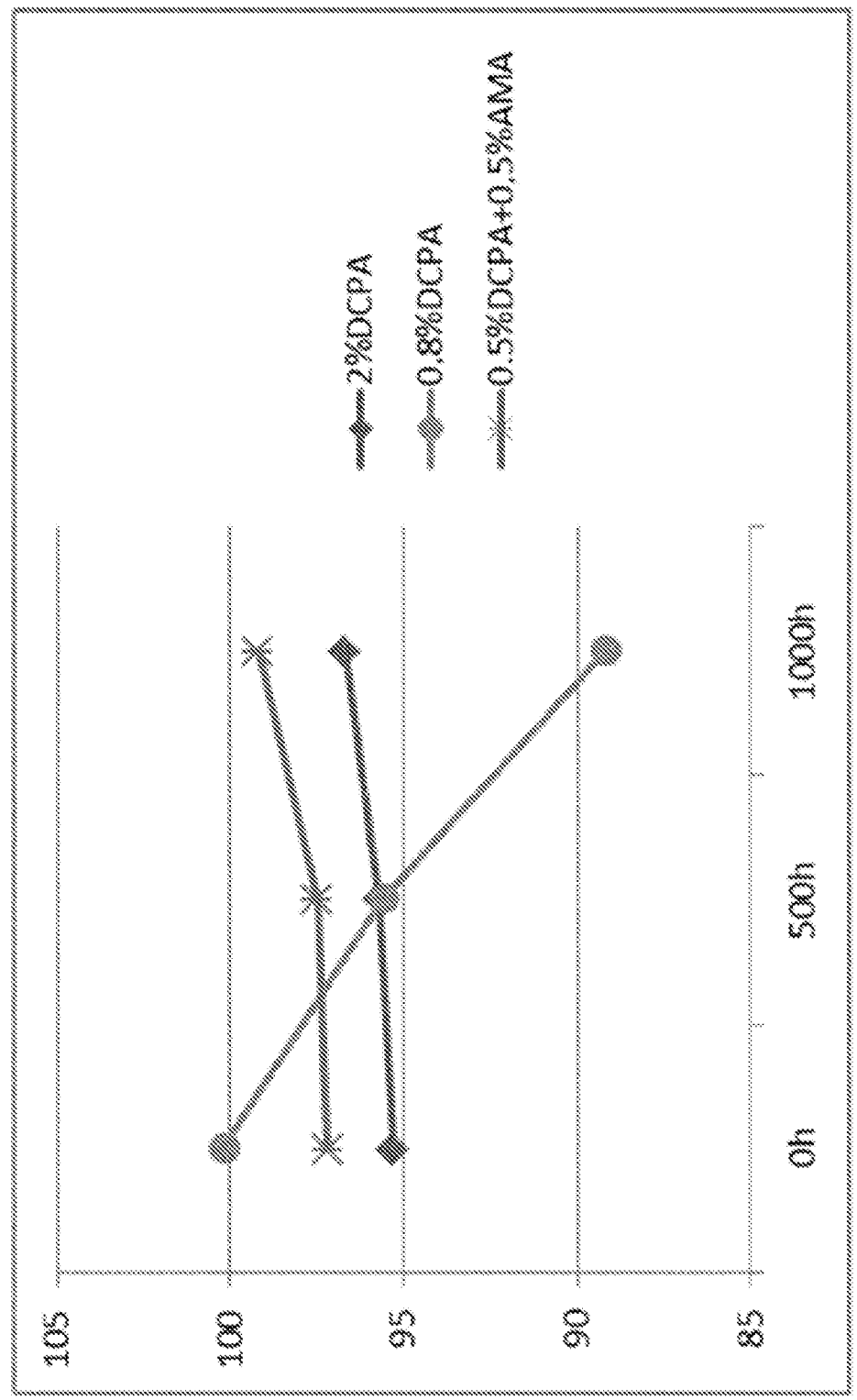
(Fig. 8)

STYRENE COPOLYMER COMPOSITIONS HAVING AN IMPROVED GLOSS

The present invention relates to thermoplastic compositions comprising at least one styrene copolymer and at least one rubber component. Also provided are acrylate-styrene-acrylonitrile (ASA) copolymer compositions and a process for preparing these copolymer compositions with improved gloss and improved UV weathering stability.

Thermoplastic compositions often comprise graft rubbers as impact modifiers; see, for example, DE-A 1260135 and DE-A 2311129. If a composition comprises styrene copolymers, especially styrene-acrylonitrile copolymers (SAN), the efficacy of the graft copolymers with regard to the impact-modifying action thereof increases with increasing size of the graft copolymers. In the case of use of small particles of graft rubbers, there is the problem that the toughness of the impact-modifying materials depends strongly on the processing temperature. Polymer compositions with improved toughness with equally good colorability can be obtained by mixing a large-particle rubber component with a small-particle rubber component (bimodal rubber particles), as described in DE-A 2826925.

The properties of ASA copolymers can be improved when the polymeric "soft phase", i.e. the graft component, comprises a crosslinker.

Crosslinkers are understood to mean at least bifunctional monomeric compounds having at least two reactive, unsaturated groups, especially C=C double bonds. The crosslinkers may be cyclic or acyclic. For instance, U.S. Pat. No. 4,876,313 describes what are called "core-shell" polymers, obtainable via emulsion polymerization with crosslinker. "Core monomers" used are preferably alkyl (meth)acrylates or styrene, and "shell monomers" used are preferably methyl methacrylate and methacrylic acid. Among the acyclic crosslinkers, the following allyl (meth)acrylate (AMA) is often used in an amount of 1-10% by weight:

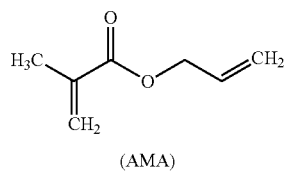

(AMA)

The use of cyclic crosslinkers, for example commercially available bicyclic dicyclopentadienyl acrylate (DCPA; acrylate of tricyclodecenyl alcohol) is also known; it is used in an amount of 0.5-5% by weight.

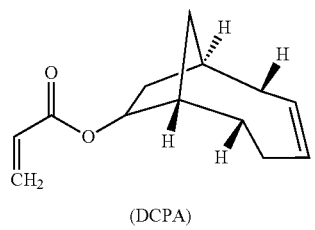

(DCPA)

Impact-resistant, polyphasic emulsion copolymers of the ASA type have a particularly balanced profile of properties when the soft acrylic ester phase (rubber component), for example composed of butyl acrylate, comprises a crosslinker. EP-A 0535456 describes a thermoplastic molding composition having improved impact resistance, comprising a styrene/acrylonitrile copolymer (hard phase) and a multi-shell graft copolymer, of which the core and the first graft shell have been crosslinked with 0.1 to 10% by weight of a cyclic crosslinker, especially dicyclopentadienyl acrylate (DCPA).

DE-A 4006643 describes a thermoplastic molding composition composed of a styrene/acrylonitrile copolymer or an α-methylstyrene-acrylonitrile copolymer and a particulate graft copolymer. The graft base is a crosslinked acrylate rubber having a particle size of 30 to 1000 nm. The crosslinkers listed are several unsaturated monomers. The preferred and exclusively used crosslinker is the acrylic ester of tricyclodecenyl alcohol (DCPA). The amount of the crosslinker is 0.1 to 5% by weight.

The prior art cited shows that the crosslinkers may be present or used in different amounts. The crosslinkers mentioned in the prior art, in the case of ASA molding compositions, have to date been useable with different particle sizes only with distinct compromises in important properties, such as gloss and yellowing. DE-A 2826925 describes an impact-resistant thermoplastic composition with good colorability, consisting of a graft copolymer (soft phase) and a hard component composed of SAN copolymer.

BRIEF DESCRIPTION OF THE DRAWINGS

FIG. 1 shows the gloss values (in %) after weathering (0 hours and 200 hours) for ASA molding compositions produced with various crosslinker types (with RUBBER-200 in the form of small particles).

FIG. 2 shows the gloss values (in %) after weathering for ASA molding compositions produced with various crosslinker types (with RUBBER-500 in the form of coarse particles).

FIG. 3 shows the yellowness index (YI) values after weathering for ASA molding compositions produced with various crosslinker types (with RUBBER-500 in the form of coarse particles and with RUBBER-200 in the form of small particles).

FIG. 4 shows the gloss values (%) after weathering (0 hours and 1000 hours) for ASA molding compositions produced with various crosslinker types (with RUBBER-500 in the form of coarse particles and with RUBBER-200 in the form of small particles).

FIG. 5 shows the yellowness indices (YI) values after weathering (0 hours and 500, 1000, and 2000 hours) for ASA molding compositions produced with various crosslinker types (with RUBBER-500 in the form of coarse particles).

FIG. 6 shows the gloss values (%) after weathering (0 hours and 1000 hours) for ASA molding compositions produced with various crosslinker types (with RUBBER-500 in the form of coarse particles).

FIG. 7 shows the yellowness indices (YI) values after weathering (0 hours and 500 and 2000 hours) for ASA molding compositions produced with various rubber types (with RUBBER-200 in the form of small particles).

FIG. 8 shows the gloss values (%) after weathering (0 hours and 500 and 1000 hours) for ASA molding compositions produced with various crosslinker types (with RUBBER-200 in the form of small particles).

The invention relates to the provision of improved thermoplastic copolymer compositions which, even in the case of exterior applications or weathering, have a low yellowness index and good gloss.

The present invention relates to thermoplastic copolymer compositions comprising (or consisting of) the following components:
50-82% by weight of an SAN copolymer A1, formed from:
  A11 60 to 70% by weight of an optionally substituted styrene,
  A12 30 to 35% by weight of acrylonitrile,
  A13 0 to 10% by weight of a further copolymerizable monomer;
15-55% by weight of a graft copolymer A2 having a mean particle size of 50 to 150 nm, formed from:
  A21 60-80% by weight of at least one rubber-like graft base having a glass transition temperature Tg<0° C.:
    A211 80-99% by weight of at least one C2-C4-alkyl acrylate
    A212 0.5-2.5% by weight of cyclic crosslinker dicyclopentadienyl acrylate (C1)
    A213 0.1 to 2.0% by weight of an acyclic further crosslinker (C2) comprising at least two functional groups
    A214 0 to 18% by weight of a further copolymerizable monomer;
  A22 20-40% by weight of at least one graft shell consisting of:
    A221 71 to 80% by weight of an optionally substituted styrene
    A222 20 to 29% by weight of acrylonitrile
    A223 0 to 9% by weight of a further copolymerizable monomer;
0-5% by weight, often 0.5-5% by weight, of assistants and/or additives C.

The percentages by weight are generally based on the overall composition. The graft polymers A2 often have a mean particle size of 80 to 115 nm.

The thermoplastic copolymer compositions mentioned, but also those mentioned hereinafter, may also comprise a plurality of SAN components (A1) and a plurality of graft copolymer components. They have improved gloss, especially after weathering, and an improved yellowness index, especially after weathering.

The present invention further relates to the provision of improved thermoplastic copolymer compositions comprising (or consisting of) the following components:
50-92% by weight of an SAN copolymer A1, formed from:
  A11 60 to 70% by weight of an optionally substituted styrene,
  A12 30 to 35% by weight of acrylonitrile,
  A13 0 to 10% by weight of a further copolymerizable monomer;
10-35% by weight of a graft copolymer B2 having a mean particle size of 420 to 590 nm, formed from:
  B21 60-80% by weight of at least one rubber-like graft base having a glass transition temperature Tg<0° C.:
    B211 80-99% by weight of at least one C2-C4-alkyl acrylate
    B212 0.5-2.5% by weight of cyclic dicyclopentadienyl acrylate crosslinker (C1)
    B213 0.1 to 2% by weight of an acyclic further crosslinker (C2) comprising at least two functional groups
    B214 0 to 18% by weight of a further copolymerizable monomer;
  B22 20-40% by weight of at least one graft shell consisting of:
    B221 71 to 80% by weight of an optionally substituted styrene
    B222 20 to 29% by weight of acrylonitrile
    B223 0 to 9% by weight of a further copolymerizable monomer;
0-5% by weight, often 0.5-5% by weight, of assistants and/or additives C.

The graft copolymers B2 often have a mean particle size of 450-550 nm.

The present invention relates to the provision of improved thermoplastic copolymer compositions comprising at least two different graft copolymers A2 and B2. It is possible here to use two separately produced graft copolymers A2 and B2, each consisting of a crosslinked acrylic ester graft base and a shell composed of acrylonitrile/styrene copolymers, where the mean particle size of the first graft copolymer (A2) is preferably 80 to 115 nm and that of the second graft copolymer (B2) 450 to 550 nm. Crosslinkers used with preference in the particular graft base are DCPA and AMA.

These compositions comprise (or consisting of) the following components:
50-82% by weight of an SAN copolymer A1, formed from 60 to 70% by weight of styrene and 30 to 40% by weight of acrylonitrile, preferably 60 to 65% by weight of styrene and 30 to 35% by weight of acrylonitrile;
10-30% by weight of a graft copolymer A2 having a mean particle size of 50 to 150 nm, often 80 to 115 nm formed from:
  A21 60-80% by weight of at least one rubber-like graft base having a glass transition temperature Tg<0° C.:
    A211 80-99% by weight of at least one C4-alkyl acrylate
    A212 0.5 to 2.2% by weight of cyclic dicyclopentadienyl acrylate crosslinker (C1)
    A213 0.1 to 0.9% by weight of an acyclic further crosslinker (C2) comprising at least two functional groups
    A214 0 to 5% by weight of a further copolymerizable monomer;
  A22 20-40% by weight of at least one graft shell consisting of:
    A221 71 to 80% by weight of styrene
    A222 20 to 29% by weight of acrylonitrile;
5-20% by weight of a graft copolymer B2 having a mean particle size of 420 to 590 nm, often 450 to 550 nm formed from:
  B21 60-80% by weight of at least one rubber-like graft base having a glass transition temperature Tg<0° C.:
    B211 80-99% by weight of at least one C4-alkyl acrylate
    B212 0.5 to 2.2% by weight of cyclic dicyclopentadienyl acrylate crosslinker (C1)
    B213 0.1 to 0.9% by weight of an acyclic further crosslinker (C2) comprising at least two functional groups
    B214 0 to 5% by weight of a further copolymerizable monomer;
  B22 20-40% by weight of at least one graft shell consisting of:
    B221 71 to 80% by weight of styrene
    B222 20 to 29% by weight of acrylonitrile;
0-5% by weight, often 0.5-5% by weight, of assistants and/or additives C.

This invention also provides a thermoplastic copolymer composition as described above, comprising at least one graft copolymer A2 or B2, produced using the cyclic crosslinker dicyclopentadienyl acrylate (C1) and the acyclic crosslinker allyl methacrylate (C2).

This invention also provides a thermoplastic copolymer composition as described above, comprising at least one graft copolymer A2 and at least one graft copolymer B2, each produced using the cyclic crosslinker dicyclopentadienyl acrylate (C1) and the acyclic crosslinker allyl methacrylate (C2).

This invention also provides a thermoplastic copolymer composition as described above, comprising (or consisting of):
65-80% by weight of an SAN copolymer A1 composed of styrene and acrylonitrile;
18-25% by weight of a graft copolymer A2 having a mean particle size of 50 to 150 nm, often 80 to 115 nm, based on a butyl acrylate rubber;
10-15% by weight of a graft copolymer B2 having a mean particle size of 420 to 590 nm, often 450-550 nm, based on a butyl acrylate rubber;
0.5-5% by weight of assistants and/or additives C.

This invention also provides a thermoplastic copolymer composition as described above, in which component A1 used is an SAN copolymer having a styrene content of 65% by weight and an acrylonitrile content of 35% by weight, and the SAN copolymer has a mean molar mass Mw of 120 000 to 180 000 g/mol.

This invention also provides a thermoplastic copolymer composition as described above, comprising (or consisting of):
65-75% by weight of an SAN copolymer A1 of styrene (65) and acrylonitrile (35);
18-22% by weight of a graft copolymer A2 having a mean particle size of 50 to 150 nm, often 80-115 nm, based on a butyl acrylate rubber, prepared using the cyclic crosslinker dicyclopentadienyl acrylate (C1) and the acyclic crosslinker allyl methacrylate (C2);
10-15% by weight of a graft copolymer B2 having a mean particle size of 420 to 590 nm, often 450-550 nm, based on a butyl acrylate rubber and prepared using the cyclic crosslinker dicyclopentadienyl acrylate (C1) and the acyclic crosslinker allyl methacrylate (C2);
0.5-5% by weight of assistants and/or additives C,
where the acrylonitrile content of the SAN copolymer A1 on the one hand and the acrylonitrile content of the SAN graft shells of the graft components A2 and B2 on the other hand differ in acrylonitrile content by at least 5% by weight.

This invention also provides a thermoplastic copolymer composition as described above, comprising (or consisting of):
65-75% by weight of an SAN copolymer A1 of styrene (65) and acrylonitrile (35);
18-22% by weight of an ASA graft copolymer A2 having a mean particle size of 150 to 200 nm, based on a butyl acrylate rubber prepared using 0.5-2.2% by weight of the cyclic crosslinker dicyclopentadienyl acrylate and 0.1-0.9% by weight of the acyclic crosslinker allyl methacrylate;
10-15% by weight of an ASA graft copolymer B2 having a mean particle size of 450 to 550 nm, based on a butyl acrylate rubber and prepared using 0.5-2.2% by weight of the cyclic crosslinker dicyclopentadienyl acrylate and 0.1-0.9% by weight of the acyclic crosslinker allyl methacrylate;
1-5% by weight of assistants and/or additives C.

The weight ratio of component A2 to component B2 is often from 3:1 to 1:1. The respective weight ratios in the polymer compositions are often:
a) A1 and A2 of 65:35 to 75:25, often 70:30;
b) A1 and B2 of 65:35 to 75:25, often 70:30;
c) A1, A2 and B2 of about 70:20:10.

The invention further relates to a process for producing a thermoplastic copolymer composition as described above, in which at least one SAN copolymer A1 consisting of an optionally substituted styrene and acrylonitrile, and at least one graft copolymer A2 and/or B2 having defined graft base-graft shell morphology is produced, and these components are optionally mixed with the further assistants and/or additives C.

It also relates to a process for producing a thermoplastic copolymer composition in which at least one SAN copolymer A1 consisting of 60-70% by weight, often 60-65% by weight, of an optionally substituted styrene and 30-40% by weight, often 30-35% by weight, of acrylonitrile, and at least one graft copolymer A2 and/or B2 is prepared and these components are optionally mixed with the further assistants and/or additives C where the graft copolymer(s) A2 and/or B2 is/are prepared from:
a) 60-80% by weight of a graft base composed of a material having a glass transition temperature Tg of less than 0° C., formed from 80-99% by weight of at least one C2-C4-alkyl acrylate, 0.5 to 2.5% by weight of the cyclic crosslinker dicyclopentadienyl acrylate (C1) and 0.1 to 2% by weight of an acyclic further crosslinker (C2) comprising at least two functional groups,
b) 20-40% by weight of a graft shell consisting of 71 to 80% by weight of an optionally substituted styrene, 20 to 29% by weight of acrylonitrile.

The invention also provides for the use of the thermoplastic compositions for production of moldings, films, fibers or coatings, especially for production of moldings or coatings for exterior applications.

The invention also relates to moldings, films, fibers or coatings comprising a thermoplastic composition as described above, or consisting of this composition. The specific combination of crosslinkers in the production of ASA copolymers can achieve optimal gloss and a good yellowness index, even after prolonged weathering, which is advantageous especially for outdoor applications, for example in passenger vehicle parts.

The individual components of the compositions are characterized hereinafter.

Component A1

Component A1 is used in amounts of 50 to 82% by weight, preferably 65 to 80% by weight.

Suitable monomers A11 are styrene and styrene derivatives such as α-methylstyrene and ring-alkylated styrenes such as p-methylstyrene and/or tert-butylstyrene. Preference is given to using styrene, α-methylstyrene and/or p-methylstyrene, especially styrene.

Monomers A12 used are preferably acrylonitrile and/or methacrylonitrile, particular preference being given to acrylonitrile. The proportion of the monomer A11 in the copolymer A1 is generally 60 to 70% by weight, preferably 65 to 70% by weight. The proportion of the monomer A12 in the copolymer A1 is generally 30 to 40% by weight, preferably 30 to 35% by weight. The copolymer A1 may additionally also comprise up to 10% by weight of at least one further copolymerizable monomer A13, for example methyl acrylate, ethyl acrylate, propyl acrylate, methyl methacrylate, ethyl methacrylate, phenylmaleimide, maleic anhydride, acrylamide and/or vinyl methyl ether.

Preferably, A1 is a copolymer of styrene and acrylonitrile. This SAN copolymer is often prepared with (about) 65% by weight of styrene and (about) 35% by weight of AN, but the AN content may also be smaller, for example 32 to 34% by weight. The SAN copolymer often has a molar mass in the Mw range from 120.000 to 180.000 g/mol. The preparation of A1 can be conducted by commonly known methods (DE-A 31 49 358, page 9 lines 18 to 32, and DE-A 32 27 555, page 9 lines 18 to 32), for example by commonly known copolymerization of A11, A12 and optionally A13 in bulk, solution, suspension or aqueous emulsion at standard temperatures in known apparatus.

Component A2

Component A2 is generally used in amounts of 15 to 55% by weight, and in the case of use of two or more rubbers preferably 10 to 30% by weight.

Useful monomers A211 for the production of the rubber-like graft base A21 generally include alkyl (meth)acrylates having a straight-chain or branched alkyl radical having 2 to 8 carbon atoms, preferably 2 to 4 carbon atoms. Preference is given to alkyl acrylates having a straight-chain or branched alkyl radical having preferably 2 to 8 carbon atoms, more preferably 2 to 4 carbon atoms, especially n-butyl acrylate. The alkyl (meth)acrylates can be used individually or in a mixture in the production of the graft base A21.

In addition, the rubber-like graft base comprises at least one acyclic crosslinker (A213) and at least one cyclic crosslinker (A212). For example, 0.1 to 2.0% by weight of allyl methacrylate is used, and 0.5 to 2.5% by weight, often 0.9 to 2.5% by weight, of the acrylic ester of tricyclodecenyl alcohol (dicyclopentadienyl acrylate; DCPA).

In addition, the rubber-like graft base A21 may comprise up to 18% by weight of further copolymerizable monomers A214. Often, however, no further crosslinkers A214 are present. Suitable monomers A214 are, for example, divinylbenzene, diallyl maleate, diallyl fumarate and/or diallyl phthalate, triallyl cyanurate.

Monomers A221 suitable for production of the graft shell A22 are vinylaromatic monomers such as styrene and/or styrene derivatives, for example alkylstyrene, preferably α-methylstyrene, and ring-alkylated styrenes such as p-methylstyrene and/or tert-butylstyrene. Preference is given to styrene.

An example of the polar copolymerizable unsaturated monomer A222 is acrylonitrile, but it is also possible to use methacrylonitrile. Further possible copolymerizable monomers A223 that may also find use are, for example, the following compounds: acrylic acid, methacrylic acid, maleic anhydride, methyl methacrylate, ethyl methacrylate, phenylmaleimide, acrylamide and vinyl methyl ether. Preferably, A223 is methyl methacrylate and/or maleic anhydride.

Preferably, the graft shell A22 is a copolymer of styrene and acrylonitrile. The production of finely divided graft copolymers A2 can be effected, for example, as described in DE-A 4006643 (page 2 line 65 to page 3 line 43).

Component B2

Component B2 is used in amounts of 10 to 35% by weight, and in the case of use of a plurality of rubbers preferably κ to 20% by weight.

Monomers used for the graft base B21 are the corresponding compounds described above for the graft base A21 (A211, A212, A213 and A214). Monomers used for the graft shell B22 are likewise the corresponding compounds described above for the graft shell A22 (A221, A222 and A223).

The production of graft copolymers from an elastomeric rubber-like graft base and a graft shell is common knowledge (see, for example, DE 4006643 A1, page 2 line 65 to page 3 line 43; DE 4131729 A1 page 3 line 12 to page 4 line 49). The production of coarse graft copolymers B2 can be effected by grafting in two stages as described in DE-A 3227555 (component B: page 8 line 14 to page 10 line 5) and DE-A 31 49 358 (page 8 line 14 to page 10 line 5).

For production of the graft copolymers A2, first of all, the rubber-like acrylic ester polymer A21 which serves as graft base is produced, for example by emulsion polymerization, by polymerizing, for example, alkyl acrylate A211 and the crosslinker A212 and optionally A213 and/or A214, for example in aqueous emulsion, in a manner known per se at temperatures between 20 and 100° C., preferably between 50 and 80° C. A mixture of vinylaromatic monomers A221 with a polar copolymerizable unsaturated monomer A222 and optionally further monomers A223 can then be grafted onto this polyacrylic acid latex formed, in which case the graft copolymerization is likewise preferably conducted in aqueous emulsion.

The production of the graft copolymers B2 for the graft base B21 is effected as described above for A2, but the grafting can be effected in two stages, in which case the vinylaromatic monomer is generally polymerized first in the presence of the graft base B21. In the second stage, the graft copolymerization can then be conducted with a mixture comprising at least one vinylaromatic monomer and acrylonitrile. The amounts of the various components used and present in the polymer mixture of the invention have already been described at the outset.

Components C

In addition, in the polymerization, the customary assistants may find use, for example in amounts of 0 to 5% by weight, often 0.5 to 5% by weight. These include, for example, emulsifiers such as alkali metal salts of alkyl- or alkylarylsulfonic acids, alkyl sulfates, fatty alcohol sulfonates, salts of higher fatty acids having 10 to 30 carbon atoms, or resin soaps. The following are also used: polymerization initiators, for example standard persulfates, for example potassium persulfate, or known redox systems, polymerization assistants, for example standard buffer substances by which pH values of preferably 6 to 9 are set, for example sodium bicarbonate and/or sodium pyrophosphate, and/or molecular weight regulators, for example mercaptans, terpineols and/or dimeric α-methylstyrene. The molecular weight regulators are often used in an amount of 0 to 3% by weight, based on the weight of the reaction mixture.

For production of the polymer mixture of the invention, the above-described particulate graft polymers A2 and/or B2 are incorporated into the resin component, i.e. the SAN copolymer A1. The incorporation can be effected, for example, by isolating the particulate graft copolymer(s) from the emulsion by adding an electrolyte and then, optionally after drying, mixing with the hard component by coextrusion, kneading or rolling. In the production of this mixture, it is also possible to add the assistants and/or additives below.

The standard additives may find use, for example in amounts of 0 to 5% by weight, often of 0.5 to 5% by weight.

Additives present may, for example, be plasticizers, antistats, light stabilizers, lubricants, blowing agents, adhesion promoters, optionally further compatible thermoplastics, fillers, surface-active substances, flame retardants, dyes and pigments, stabilizers against oxidation, hydrolysis, light (UV), heat or discoloration and/or reinforcers.

Light stabilizers used may be all standard light stabilizers, for example compounds based on benzophenone, benzotriazole, cinnamic acid, organic phosphites and phosphonites, and sterically hindered amines.

Examples of useful lubricants include hydrocarbons such as oils, paraffins, PE waxes, PP waxes, fatty alcohols having 6 to 20 carbon atoms, ketones, carboxylic acids such as fatty acids, montanic acid or oxidized PE wax, carboxamides and carboxylic esters, for example with the alcohols ethanol, fatty alcohols, glycerol, ethanediol, pentaerythritol, and long-chain carboxylic acids as acid component.

Stabilizers used may be standard antioxidants, for example phenolic antioxidants, e.g. alkylated monophenols, esters and/or amides of β-(3,5-di-tert-butyl-4-hydroxyphenyl)-propionic acid and/or benzotriazoles. Possible antioxidants are mentioned by way of example in EP-A 698637 and EP-A 669367. Specifically, phenolic antioxidants which may be mentioned are 2,6-di-tert-butyl-4-methylphenol, pentaerythrityl tetrakis[3-(3,5-di-tert-butyl-4-hydroxyphenyl)propionate and N,N'-di(3,5-di-tert-butyl-4-hydroxyphenyl-propionyl)hexamethylenediamine. The stabilizers mentioned can be used individually or in mixtures.

Further compatible thermoplastics may, for example, be polyesters (e.g. polyethylene terephthalate, polybutylene terephthalate), PMMA, polycarbonate, polyamide, polyoxymethylene, polystyrene, polyethylene, polypropylene, polyvinyl chloride.

These assistants and/or additives can be used either directly in the production of the thermoplastic component A1 or added to component A1, A2 and/or B2 in the production of the mixture.

The invention further provides moldings produced from the polymer compositions of the invention. The polymer compositions of the invention may, for example, be pelletized or granulated, or processed by commonly known methods, for example by extrusion, injection molding, blow molding or calendaring, to give moldings of all kinds, such as cable sheathing, films, hoses, fibers, profiles, shoe shells, shoe soles, technical moldings (such as motor vehicle parts); consumer articles, coatings, bellows and/or animal ear tags.

The polymer mixtures of the invention are notable, especially in the event of or after weathering, for retention of gloss and yellowness index. Therefore, the polymer mixtures of the invention can be used particularly advantageously for production of moldings which are used outdoors, in sunshine and at varying temperatures. By way of example, without restriction thereto, outdoor applications may be mentioned in this connection, for example in the automobile or construction sector.

The invention also provides for the production of the copolymer compositions by mixing the components, and for the uses of moldings produced from the polymer mixtures of the invention for outdoor applications. These advantages such as optimized gloss and improved UV weathering stability are to be shown by the examples which follow.

The examples, figures and claims serve for more detailed description of the invention.

EXAMPLES

For the production of the thermoplastic copolymer compositions, the following components were used:
SAN copolymer (A1), with 65% S and 35% AN
two different rubbers (A2 and B2, both with Tg<0° C.), called RUBBER-200 and RUBBER-500
assistants and additives (C), for example C12- to C18- paraffinsulfonic acid,
initiators such as potassium peroxodisulfate, and also sodium hydrogencarbonate and sodium pyrophosphate; and various crosslinkers, especially allyl methacrylate (AMA) and/or dicyclopentadienyl acrylate (DCPA).

The characterization of the thermoplastic compositions produced in accordance with the invention can be effected by measuring various parameters.

a) Charpy notched impact resistance is measured to ISO 179 1 eA at 23° C., and at injection molding temperature 220° C. The aim is to obtain a high notched impact resistance even at low processing temperatures.

b) Mean particle size is determined by an ultracentrifuge by the method of W. Scholtan and H. Lange, Kolloid-Z. and Z. Polymere 250 (1972), 782-796. The ultracentrifuge measurement gives the integral mass distribution of the particles of a sample. The mean particle diameter $d_{50}$ is defined as the diameter at which 50% by weight of the particles have smaller and 50% by weight of the particles have greater diameter.

c) The weathering of the thermoplastic compositions can be effected in accordance with DIN EN ISO 4892-2 ("Plastics—Methods of exposure to laboratory light sources"; Part 2: Xenon-arc lamps (ISO 4892-2:2013)).

d) Yellowness index (YI) determination can be effected for the thermoplastic compositions in accordance with standard DIN 6767 (1980) "Yellowness index of light-colored plastics".

e) Gloss determination can be effected for the thermoplastic compositions in accordance with DIN 67530 (1982) "Gloss on surfaces of plastics" at a measurement angle of 60° (see ISO 2813-1978).

Example 1

Production of the Thermoplastic Molding Compositions

Component A1:
SAN copolymer (matrix) produced with 65% by weight of styrene and 35% by weight of acrylonitrile;
viscosity number: 80 ml/g (VN; measured in 0.5% toluene solution at 20° C.); molar mass: Mw: 145 800 g/mol; Mn: 57 700 g/mol.

Components A1 can quite generally be produced by a solution polymerization method, as described by way of example in Kunststoff-Handbuch [Plastics Handbook], edited by Vieweg-Daumiller, volume V (Polystyrene), Carl-Hanser-Verlag, Munich, 1969, page 124.

Production of Components A2 and B2:
Graft rubber, small particles (e.g. RUBBER-200) produced according to DE-A 40 06 643 as follows:
a) Illustrative production of the graft base
160 g of the mixture of 98% by weight of butyl acrylate (BA) and 2% by weight of crosslinker (DCPA) were heated to 60° C. in 1500 g of water with addition of 5 g of the sodium salt of a C12- to C18-paraffinsulfonic acid, 3 g of potassium peroxodisulfate, 3 g of sodium hydrogencarbonate and 1.5 g of sodium pyrophosphate while stirring. 10 minutes after the onset of the polymerization reaction, within 3 hours, a further 840 g of the monomer mixture were added. After the addition of monomer had ended, the emulsion was kept at 60° C. for another hour.

b) Production of the particulate graft polymer (A2; e.g. RUBBER-200)
2100 g of the emulsion produced by method (a) were mixed with 1150 g of water and 2.7 g of potassium peroxodisulfate and heated to 65° C. while stirring. On attainment of the reaction temperature, over the course of 3 hours, a mixture of 420 g of styrene and 140 g of acrylonitrile was metered in. After the addition had ended, the emulsion was kept at 65° C. for another 2 hours. The graft polymer was precipitated out of the emulsion by means of calcium chloride solution at 95° C., washed with water and dried in a warm air stream. The mean particle size of the rubber latex particles was 100 nm.

c) Production of the graft rubber (B2, coarse particles, e.g. RUBBER-500) corresponding to DE-A 4131729:

To an initial charge of 1.5 parts of a polyacrylate latex produced analogously to the manner above, after addition of 50 parts water and 0.1 part potassium persulfate over the course of 3 hours, were added, at 60° C., firstly a mixture of 49 parts butyl acrylate and 1 part tricyclodecenyl acrylate (DCPA) and secondly a solution of 0.5 part of the sodium salt of a C12-C18-paraffinsulfonic acid in 25 parts water. After the feed had ended, polymerization was continued for 2 hours. The resultant latex of the crosslinked butyl acrylate polymer had a solids content of 40%. The mean particle size (weight-average for the latex) was found to be 430 nm. The particle size distribution was narrow (Q=0.1). 150 parts of this latex were then mixed with 20 parts styrene and 60 parts water and heated while stirring, after addition of a further 0.03 part potassium persulfate and 0.05 part lauroyl peroxide, to 65° C. for 3 hours. The dispersion obtained in the graft copolymerization was then polymerized with 20 parts of a mixture of styrene and acrylonitrile in a ratio of 75:25 for a further 4 hours. The reaction product was then precipitated out of the dispersion with a calcium chloride solution at 95° C., removed, washed with water and dried in a warm air stream. The level of grafting of the graft copolymer was found to be 35%. The mean particle size of the rubber latex particles was 510 nm.

d) For production of the mixture of the graft rubber (A2 or B2) with the hard component, the SAN copolymer (A1), the precipitated and dried graft copolymer from (b) or c) is blended in an extruder at 260° C. with the hard component A1 in such a way that the resulting mixture had a graft polymer content of about 50% (by weight). Moldings can be produced from this mixture by injection molding.

In separate experiments, component A1 was mixed intimately with the particular component A2 or B2 in a weight ratio of 70:30 and with the particular further additives in an extruder (ZSK 30 twin-screw extruder from Werner & Pfleiderer) at a temperature of 230° C.

Example 2

Production of Thermoplastic Polymer Compositions with Optimized Gloss and UV Weathering Stability To clarify the synergistic effects achieved through the use of several different crosslinkers, especially of DCPA and AMA, on the gloss properties of the thermoplastic molding compositions or moldings, and on the yellowness indices thereof after weathering, the ASA molding compositions which follow were produced (using RUBBER-200 in the form of small particles or RUBBER-500 in the form of large particles by compounding in an extruder, using either just one crosslinker (cyclic or acyclic) or else a combination of two crosslinkers (cyclic and acyclic) for comparative purposes:

| RUBBER-200 graft | 2.0% DCPA | 0.4% AMA | 1.0% DCPA + 0.4% AMA |
|---|---|---|---|
| Gel | 98.6 | 98.5 | 99.1 |
| QI | 10.1 | 8.9 | 7.5 |

| RUBBER-500 graft | 2.0% DCPA | 0.4% AMA | 1.0% DCPA + 0.2% AMA |
|---|---|---|---|
| Gel | 90.6 | 93.1 | 91.9 |
| QI | 8.9 | 7.3 | 8.3 |

For ASA compositions comprising a RUBBER-200 and a 10-55% rubber content, improved gloss values were found, especially after weathering, with 0-2.0% plasticizer (phthalic ester isomers), 0-1.5% by weight of wax, 0-1.5% by weight of UV stabilizers and 0-2% by weight of pigments. The ASA compositions need not comprise any assistants and/or additives C, but frequently include 0.5 to 5% by weight of these for relatively large production volumes.

FIG. 1 shows the gloss values (in %) after weathering (0 hours and 200 hours), it being clear that the combined use of a cyclic crosslinker (DCPA) and an acyclic further crosslinker (AMA) comprising at least two functional groups in the production of the rubber achieves distinctly improved gloss values for the moldings.

| ASA, RUBBER-200 | 2.0% DCPA | 0.4% AMA | 1.0% DCPA + 0.4% AMA |
|---|---|---|---|
| Ak 23° C. | 8.8 | 7.5 | 8.1 |

As this table shows, notched impact resistance (Ak, measured at 23° C.) is also very favorable when two different crosslinkers are used.

Example 3

Production of Thermoplastic Polymer Compositions with Optimized Gloss and UV Weathering Stability In an experiment conducted in analogy to example 2, the gloss profile values (in %) shown in FIG. 2 were found after weathering for ASA molding compositions produced with various crosslinker types (with RUBBER-500 in form of coarse particles).

Example 4

Production of ASA Polymer Compositions with Two Different Rubber Types and Optimized Gloss and UV Weathering Stability In an experiment conducted in analogy to example 2, the yellowness index (YI) values shown in FIG. 3 were found after weathering for ASA molding compositions produced with various crosslinker types (with RUBBER-500 in form of coarse particles and with RUBBER-200 in the form of small particles). These compositions all comprised mixtures of 70% by weight of SAN (A1) and 20% by weight of RUBBER-200 and 10% by weight of RUBBER-500.

For these ASA compositions comprising two rubber types, a distinct improvement in yellowness indices was found, especially after weathering, when a combination of DCPA and AMA was used in the rubber production.

The left-hand column in each case shows the use of "DCPA only" (2% for each of the rubber types); the yellowness indices are high. The middle column in each case shows the use of "AMA only" (0.4% for each of the rubber types). The right-hand column in each case shows the use of "DCPA plus AMA" (in the case of rubber type RUBBER-200: 1% DCPA+0.4 AMA; in the case of rubber type RUBBER-500: 1% DCPA+0.2 AMA). It can be seen that, after prolonged weathering (200 h), the combined use of a cyclic crosslinker (DCPA) and an acyclic further crosslinker (AMA) achieves a distinct improvement in yellowness indices (lower YI) for the moldings.

Example 5

In the experiment conducted in analogy to example 4, in addition, the gloss values (%) shown in FIG. 4 were found after weathering (0 hours and 1000 hours) for ASA molding compositions produced with various crosslinker types and comprising RUBBER-500 in the form of coarse particles and comprising RUBBER-200 in the form of small particles.

These compositions all comprised mixtures of 70% by weight of SAN (A1) and 20% by weight of rubber (RUBBER-200) and 10% by weight of rubber (RUBBER-500).

| SAN:RUBBER-200:RUBBER-500 (70:20:10) | 2.0% DCPA 2.0% DCPA | 0.4% AMA 0.4% AMA | 1.0% DCPA + 0.25% AMA 1.0% DCPA + 0.1% AMA |
|---|---|---|---|
| Ak 23° C. | 12.5 | 10.0 | 11.8 |
| An 23° C. | 298 | 284 | 279 |

As this table shows, notched impact resistance (Ak) and impact resistance (An) are also very favorable when two different crosslinkers are used.

For these ASA compositions comprising two different rubber types, a distinct improvement in gloss values, especially after long weathering, was found when a combination of DCPA and AMA was used in the rubber production. The use of "DCPA only" (2% for each of the rubber types) leads to a gloss value below 90%. The use of "AMA only" (in the case of rubber type RUBBER-200: 0.4 AMA; in the case of rubber type RUBBER-500: 0.2 AMA) leads to even poorer gloss after weathering. The use of "DCPA plus AMA" (in the case of RUBBER-200: 1% DCPA+0.25 AMA; in the case of RUBBER-500: 1% DCPA+0.1 AMA) leads to a gloss value well above 90% after weathering for more than 40 days.

Example 6

Production of ASA polymer compositions comprising rubber in the form of coarse particles and optimized gloss and UV weathering stability In an experiment conducted in analogy to example 3, the yellowness indices (YI) shown in FIG. 5 after weathering (0 hours and 500, 1000 and 2000 h) were found for ASA molding compositions produced with various crosslinker types (comprising RUBBER-500 in the form of coarse particles). These compositions all comprised mixtures of 70% by weight of SAN (A1) and 30% by weight of RUBBER-500.

For these ASA compositions comprising rubber in the form of coarse particles, a distinct improvement in yellowness indices was found, especially after long weathering (at least 1000 h), when a combination of DCPA and AMA was used in the rubber production. The left-hand column in each case shows the use of "DCPA only"; the yellowness indices after weathering are high. The right-hand column in each case shows the use of "DCPA plus AMA" (1% DCPA+0.1% AMA). It can be seen that, after prolonged weathering (1000 h), the combined use of a cyclic crosslinker (DCPA) and an acyclic further crosslinker (AMA), achieves a distinct improvement in yellowness indices (lower YI) for the moldings.

Example 7

Production of ASA Polymer Compositions Comprising Rubber in the Form of Coarse Particles and Optimized Gloss and UV Weathering Stability In an experiment conducted in analogy to example 3, the gloss values (%) shown in FIG. 6 were found after weathering (0 hours and 1000 h) for ASA molding compositions produced with various crosslinker types (with RUBBER-500 in the form of coarse particles). These compositions all comprised mixtures of 70% by weight of SAN (A1) and 30% by weight of RUBBER-500.

| SAN:RUBBER-500 (70:30) | 2.0% DCPA | 1.0% DCPA + 0.1% AMA |
|---|---|---|
| Ak 23° C. | 11.9 | 11.0 |
| Ak 0° C. | 8.2 | 8.3 |
| An −30° C. | 96 | 96 |

As this table shows, impact resistance (Ak or An), measured at three different temperatures, is very favorable when two different crosslinkers are used.

For these ASA compositions comprising rubber in the form of coarse particles, a distinct improvement in gloss values of more than 100%, before and after weathering, was found when a combination of DCPA and AMA was used in the rubber production.

Example 8

Production of ASA Polymer Compositions Comprising Rubber in the Form of Small Particles and Optimized Gloss and UV Weathering Stability In an experiment conducted in analogy to example 2, the yellowness indices (YI) shown in FIG. 7 were found after weathering (0 hours and 500 and 2000 h) for ASA molding compositions produced with various rubber types (comprising rubber (RUBBER-200) in the form of small particles). These compositions all comprised mixtures of 70% by weight of SAN (A1) and 30% by weight of rubber (RUBBER-200).

For these ASA compositions comprising rubber in the form of small particles, a distinct improvement in yellowness indices was found, especially after weathering, when a combination of DCPA and AMA was used in the rubber production. The left-hand column in each case shows the use of "DCPA only" (2% by weight); the yellowness indices are high after weathering.

The middle column in each case shows the use of "DCPA only" (0.4% by weight); the yellowness indices are particularly high after weathering. The right-hand column in each case shows the use of "DCPA plus AMA" (1% DCPA+0.4% AMA). It can be seen that, after prolonged weathering (at least 1000 h), the combined use of a cyclic crosslinker (DCPA) and an acyclic further crosslinker (AMA) achieves a distinct improvement in yellowness indices (lower YI) for the moldings.

Example 9

Production of ASA Polymer Compositions Comprising Rubber in the Form of Small Particles and Optimized Gloss and UV Weathering Stability In an experiment conducted in analogy to example 2, the gloss values (%) shown in FIG. 8 were found after weathering (0 hours and 500 and 1000 h) for ASA molding compositions produced with various crosslinker types (comprising RUBBER-200 in the form of small particles).

These compositions all comprised mixtures of 70% by weight of SAN (A1) and 30% by weight of RUBBER-200.

For these ASA compositions comprising rubber in the form of small particles, a distinct improvement in gloss values was found after weathering when a combination of DCPA and AMA was used in the rubber production.

| SAN:RUBBER-200 | 2.0% DCPA | 1.0% DCPA + 0.4% AMA | 0.5% DCPA + 0.5% AMA |
|---|---|---|---|
| Ak −30° C. | 1.5 | 1.3 | 1.4 |
| Ak 23° C. | 5.2 | 6.5 | 6.2 |
| An −30° C. | 61 | 73 | 69 |

The invention claimed is:

1. A thermoplastic copolymer composition comprising the following components:
   50-82% by weight of an SAN copolymer A1, formed from:
   A11 60 to 70% by weight of an optionally substituted styrene,
   A12 30 to 35% by weight of acrylonitrile,
   A13 0 to 10% by weight of a further copolymerizable monomer;
   15-55% by weight of a graft copolymer A2 having a mean particle size of 50 to 150 nm, formed from:
   A21 60-80% by weight of at least one graft base having a glass transition temperature Tg<0° C.:
   A211 80-99% by weight of at least one C2-C4-alkyl acrylate,
   A212 0.5 to 2.5% by weight of cyclic dicyclopentadienyl acrylate crosslinker (C1),
   A213 0.1 to 2.0% by weight of an acyclic further crosslinker (C2) comprising at least two functional groups wherein the acyclic further crosslinker (C2) is allyl methacrylate,
   A214 0 to 18% by weight of a further copolymerizable monomer;
   A22 20-40% by weight of at least one graft shell consisting of:
   A221 71 to 80% by weight of an optionally substituted styrene,
   A222 20 to 29% by weight of acrylonitrile,
   A223 0 to 9% by weight of a further copolymerizable monomer; and
   0-5% by weight of assistants and/or additives C.

2. A thermoplastic copolymer composition comprising the following components:
   50-82% by weight of an SAN copolymer A1, formed from:
   A11 60 to 70% by weight of an optionally substituted styrene,
   A12 30 to 35% by weight of acrylonitrile,
   A13 0 to 10% by weight of a further copolymerizable monomer;
   10-35% by weight of a graft copolymer B2 having a mean particle size of 420 to 590 nm, formed from:
   B21 60-80% by weight of at least one graft base having a glass transition temperature Tg<0° C.:
   B211 80-99% by weight of at least one C2-C4-alkyl acrylate,
   B212 0.5 to 2.5% by weight of cyclic dicyclopentadienyl acrylate crosslinker (C1),
   B213 0.1 to 2% by weight of an acyclic further crosslinker (C2) comprising at least two functional groups,
   B214 0 to 18% by weight of a further copolymerizable monomer;
   B22 20-40% by weight of at least one graft shell consisting of:
   B221 71 to 80% by weight of an optionally substituted styrene,
   B222 20 to 29% by weight of acrylonitrile,
   B223 0 to 9% by weight of a further copolymerizable monomer; and
   0-5% by weight of assistants and/or additives C.

3. A thermoplastic copolymer composition comprising the following components:
   50-82% by weight of an SAN copolymer A1 formed from 60 to 65% by weight of styrene and 30 to 35% by weight of acrylonitrile;
   10-30% by weight of a graft copolymer A2 having a mean particle size of 50 to 150 nm, formed from:
   A21 60-80% by weight of at least one graft base having a glass transition temperature Tg<0° C.:
   A211 80-99% by weight of at least one C4-alkyl acrylate,
   A212 0.5 to 2.2% by weight of cyclic dicyclopentadienyl acrylate crosslinker (C1),
   A213 0.1 to 0.9% by weight of an acyclic further crosslinker (C2) comprising at least two functional groups,
   A214 0 to 5% by weight of a further copolymerizable monomer;
   A22 20-40% by weight of at least one graft shell consisting of:
   A221 71 to 80% by weight of styrene,
   A222 20 to 29% by weight of acrylonitrile;
   5-20% by weight of a graft copolymer B2 having a mean particle size of 420 to 590 nm, formed from:
   B21 60-80% by weight of at least one graft base having a glass transition temperature Tg<0° C.:
   B211 80-99% by weight of at least one C4-alkyl acrylate,
   B212 0.5 to 2.2% by weight of cyclic dicyclopentadienyl acrylate crosslinker (C1),
   B213 0.1 to 0.9% by weight of an acyclic further crosslinker (C2) comprising at least two functional groups,
   B214 0 to 5% by weight of a further copolymerizable monomer;
   B22 20-40% by weight of at least one graft shell consisting of:
   B221 71 to 80% by weight of styrene,
   B222 20 to 29% by weight of acrylonitrile; and
   0-5% by weight of assistants and/or additives C.

4. The thermoplastic copolymer composition as claimed in claim 2, comprising at least one graft copolymer A2 or B2, prepared using the cyclic crosslinker dicyclopentadienyl acrylate (C1) and the acyclic crosslinker allyl methacrylate (C2).

5. The thermoplastic copolymer composition as claimed in claim 3, comprising at least one graft copolymer A2 and at least one graft copolymer B2, each prepared using the cyclic crosslinker dicyclopentadienyl acrylate (C1) and the acyclic crosslinker allyl methacrylate (C2).

6. The thermoplastic copolymer composition as claimed in claim 3, comprising:
   65-80% by weight of an SAN copolymer A1 of styrene and acrylonitrile;
   18-25% by weight of a graft copolymer A2 having a mean particle size of 50 to 150 nm, based on a butyl acrylate rubber;
   10-15% by weight of a graft copolymer B2 having a mean particle size of 420 to 590 nm, based on a butyl acrylate rubber; and
   0.5-5% by weight of assistants and/or additives C.

7. The thermoplastic copolymer composition as claimed in claim 2, in which an SAN copolymer having a styrene content of 65% by weight and an acrylonitrile content of 35% by weight is used as component A1, and the SAN copolymer has a mean molar mass Mw of 120 000 to 180 000 g/mol.

8. The thermoplastic copolymer composition as claimed in claim 3, comprising:
- 65-75% by weight of an SAN copolymer A1 of styrene (65% by weight) and acrylonitrile (35% by weight);
- 18-22% by weight of a graft copolymer A2 having a mean particle size of 50 to 150 nm, based on a butyl acrylate rubber, prepared using the cyclic crosslinker dicyclopentadienyl acrylate (C1) and the acyclic crosslinker allyl methacrylate (C2);
- 10-15% by weight of a graft copolymer B2 having a mean particle size of 420 to 590 nm, based on a butyl acrylate rubber and prepared using the cyclic crosslinker dicyclopentadienyl acrylate (C1) and the acyclic crosslinker allyl methacrylate (C2);
- 0.5-5% by weight of assistants and/or additives C,
- where the acrylonitrile content of the SAN copolymer A1 on the one hand and the acrylonitrile content of the SAN graft shells of the graft components A2 and B2 on the other hand differ in acrylonitrile content by at least 5% by weight.

9. The thermoplastic copolymer composition as claimed in claim 3, comprising:
- 65-75% by weight of an SAN copolymer A1 of styrene (65% by weight) and acrylonitrile (35% by weight);
- 18-22% by weight of an ASA graft copolymer A2 having a mean particle size of 50 to 150 nm, based on a butyl acrylate rubber prepared using 0.5-2.2% by weight of the cyclic crosslinker dicyclopentadienyl acrylate and 0.1-0.9% by weight of the acyclic crosslinker allyl methacrylate;
- 10-15% by weight of an ASA graft copolymer B2 having a mean particle size of 450 to 550 nm, based on a butyl acrylate rubber and prepared using 0.5-2.2% by weight of the cyclic crosslinker dicyclopentadienyl acrylate and 0.1-0.9% by weight of the acyclic crosslinker allyl methacrylate;
- 1-5% by weight of assistants and/or additives C.

10. A process for preparing the thermoplastic copolymer composition as claimed in claim 2, in which at least one SAN copolymer A1 consisting of an optionally substituted styrene and acrylonitrile, and at least one graft copolymer A2 and/or B2 with defined graft base-graft shell morphology is prepared, and these components are optionally mixed with the further assistants and/or additives C.

11. The process for preparing the thermoplastic copolymer composition according to claim 10, in which at least one SAN copolymer A1, consisting of 60-65% by weight of an optionally substituted styrene and 30-35% by weight of acrylonitrile, and at least one graft copolymer A2 and/or B2 is prepared, and these components are optionally mixed with the further assistants and/or additives C, where the graft copolymer(s) A2 and/or B2 are prepared from:
- a) 60-80% by weight of a graft base composed of a material having a glass transition temperature Tg of less than 0° C., formed from 80-99% by weight of at least one C2-C4-alkyl acrylate, 0.5 to 2.5% by weight of the cyclic crosslinker dicyclopentadienyl acrylate (C1) and 0.1 to 2% by weight of an acyclic further crosslinker (C2) comprising at least two functional groups,
- b) 20-40% by weight of a graft shell consisting of 71 to 80% by weight of an optionally substituted styrene, 20 to 29% by weight of acrylonitrile.

12. A molding, film, fiber or coating comprising the thermoplastic composition as claimed in claim 2.

13. The thermoplastic copolymer composition as claimed in claim 3, comprising at least one graft copolymer A2 or B2, prepared using the cyclic crosslinker dicyclopentadienyl acrylate (C1) and the acyclic crosslinker allyl methacrylate (C2).

14. The thermoplastic copolymer composition as claimed in claim 3, in which an SAN copolymer having a styrene content of 65% by weight and an acrylonitrile content of 35% by weight is used as component A1, and the SAN copolymer has a mean molar mass Mw of 120 000 to 180 000 g/mol.

15. A process for preparing the thermoplastic copolymer composition as claimed in claim 3, in which at least one SAN copolymer A1 consisting of an optionally substituted styrene and acrylonitrile, and at least one graft copolymer A2 and/or B2 with defined graft base-graft shell morphology is prepared, and these components are optionally mixed with the further assistants and/or additives C.

16. A molding, film, fiber or coating comprising the thermoplastic composition as claimed in claim 3.

* * * * *